United States Patent [19]

Shiozaki et al.

[11] Patent Number: 4,770,279
[45] Date of Patent: Sep. 13, 1988

[54] ONE-WAY CLUTCH

[75] Inventors: Takeshi Shiozaki; Yutaka Tokizane, both of Kasugai; Mitsuo Mizuno, Kagamihara, all of Japan

[73] Assignee: Nippo Sangyo Kabushiki Kaisha Co Ltd, Japan

[21] Appl. No.: 30,501

[22] Filed: Mar. 27, 1987

[30] Foreign Application Priority Data

Mar. 28, 1986 [JP] Japan .................. 61-71950

[51] Int. Cl.$^4$ ............................................. F16D 41/06
[52] U.S. Cl. ................................. 192/45; 192/84 PM
[58] Field of Search ............... 192/45, 84 PM, 41 R; 188/82.84

[56] References Cited

U.S. PATENT DOCUMENTS

| 2,300,223 | 10/1942 | Hotterroth, Jr. | 192/45 |
| 2,410,818 | 11/1946 | Grant, Jr. | 192/45 |
| 2,583,843 | 1/1952 | Herrick | 192/45 |
| 2,624,435 | 1/1953 | Stephenson | 192/45 |
| 2,804,184 | 8/1957 | Björk | 192/45 |
| 3,432,016 | 3/1969 | Vogt | 192/45 |

FOREIGN PATENT DOCUMENTS

| 614738 | 12/1948 | United Kingdom . |
| 727855 | 4/1955 | United Kingdom . |
| 753388 | 7/1956 | United Kingdom . |
| 1060185 | 3/1967 | United Kingdom . |

Primary Examiner—Leslie A. Braun
Assistant Examiner—Richard M. Lorence
Attorney, Agent, or Firm—Fred Philpitt

[57] ABSTRACT

A one-way clutch that employs spaced apart magnetic members to draw rollers into portions of a cam surface so that a shaft and race will rotate as one.

1 Claim, 2 Drawing Sheets

ONE-WAY CLUTCH

The present invention relates to a relatively small one-way clutch which is mainly employed in a drive mechanism for business machines such as facsimiles and electronic copiers.

Figure 4:
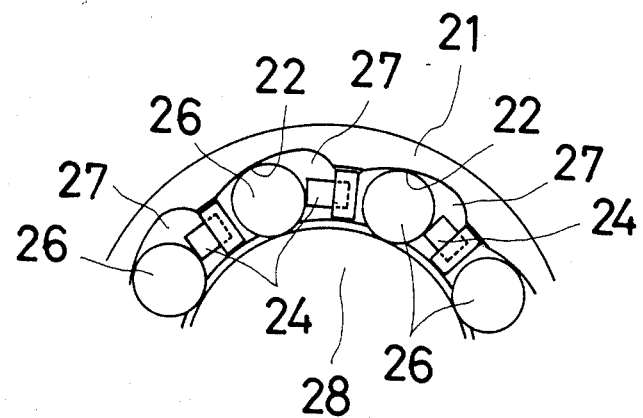
FIG. 4 is a front elevational view of the known one-way clutch.

A one-way clutch of the above described type generally comprises, as shown in FIG. 4, an outer race 21 with cam surfaces 22 formed on the inner peripheral surface thereof; a shaft 28 forming together with the cam surfaces 22 spaces 27 between the shaft and the cam surfaces; and rollers 26 and metal springs 24 displaced in the spaces 27 through a metal or plastic retainer, whereby the rollers 26 are urged in one direction by the resilient force of the metal springs 24. In such a one-way clutch, at the time of transmission of the driving force, the metal springs 24 pressingly advance the rollers 26 to the engaging positions of the cam surfaces 22. This makes the outer race 21 and the shaft 28 rotate together. During racing, the rollers 26 are spaced away from the engaging positions of the associated cam surfaces 22 against resilient force of the metal springs 24, thereby causing the outer race to race with respect to the shaft 28.

As business machines such as facsimiles and electronic copiers are being sold in increasing numbers the demand for one-way clutches employed in the driving mechanisms of these machines has greatly increased, and hence there has been a great desire for low cost products. However, the one-way clutches employed in the driving mechanisms of these machines are small in size. It has therefore been difficult to produce known one-way clutches of the type which employ metal springs and a retainer.

The known one-way clutch also suffers from a problem resulting from the physical resistance exerted by the metal spring.

Various types of retainers and metal springs have accordingly been proposed for the purpose of reducing the physical resistance of these metal springs. None of these, however, has satisfied all the requirements, because they have involved complicated structures or the employment of special materials. These factors have conversely, served to raise the production cost.

In other words, the complicated assembly and production processes which have been adopted in such one-way clutches have inevitably raised the cost of production.

In view of the above noted disadvantages of the prior art, a one-way clutch is provided which includes an outer race 1 with cam surfaces 2 formed on the outer peripheral surface thereof; a shaft 8 forming together with the cam surfaces 2 spaces 7 between the cam surfaces and the shaft; and rollers 6 disposed in the spaces 7 in such a manner as to be urged in one direction, wherein a magnetic substance 4 is disposed between the cam surfaces 2 formed on the inner peripheral surface of the outer race 1 for urging the associated roller 6 in one direction.

In other words, a one-way clutch of the present invention employs a magnetic substance 4 in place of a metal spring 24 as is used in conventional products.

In a one-way clutch constructed in the manner described above, at the time of transmission of driving force, the rollers 6, which are already at their engaging positions of the associated cam surfaces 2 by virtue of the attraction of the magnetic members 4, become instantaneously engaged with the associated cam surfaces 2 and the peripheral surface of the shaft 8, and this makes the outer race 1, the roller 6, and the shaft 8 rotate together. At the time of racing, the rollers 6 are spaced away from the engaging positions of the cam surfaces 2 against the urging force of the magnetic substances 4 by a reverse torque, so as to cause the shaft 8 to race with respect to the outer race 1.

Figure 1:
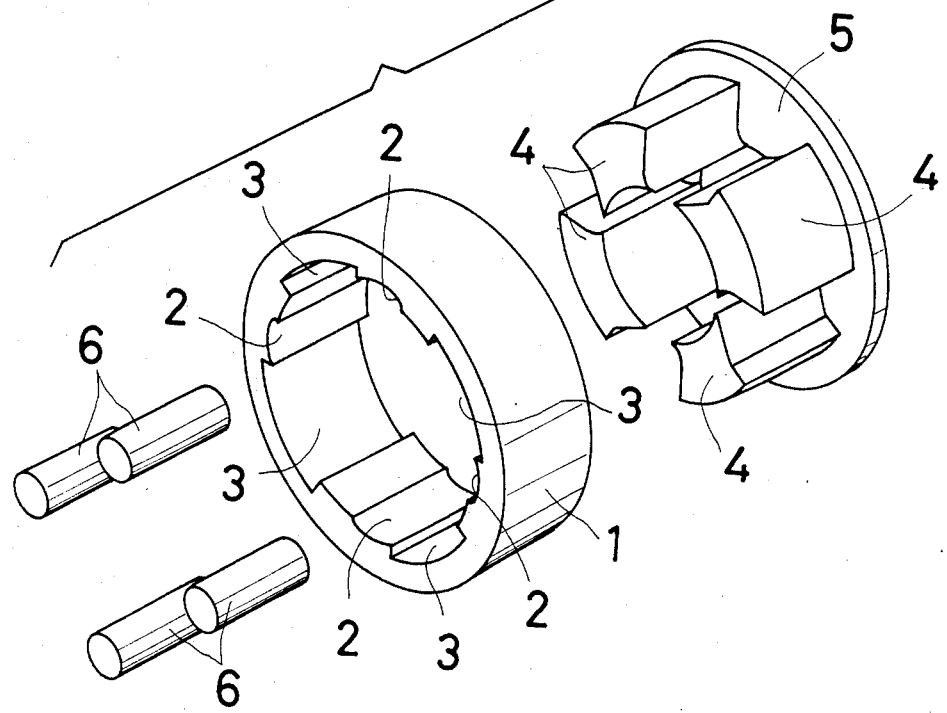
FIG. 1 is a perspective view of a one-way clutch of the present invention.
Figure 2:
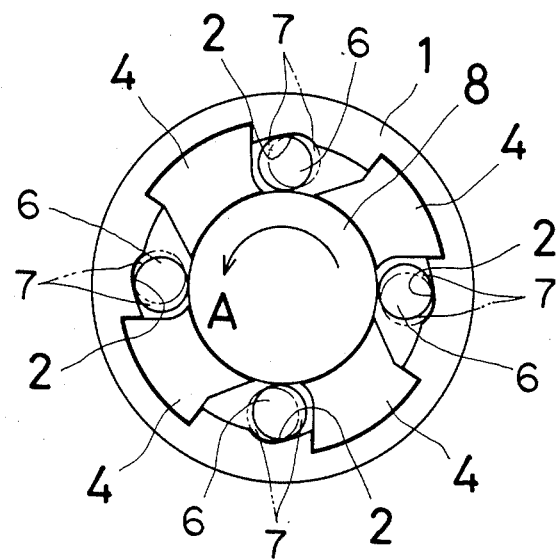
FIG. 2 is a front elevational view of the one-way clutch of FIG. 1.

An embodiment of the present invention will be described with reference to the accompanying drawings. Referring to FIGS. 1 and 2, an outer race 1 has cam surfaces 2 and engaging recesses 3 which fixedly engage with magnetic substances 4 alternately formed on the inner peripheral surface thereof.

Any material such as metal or a synthetic resin may be employed as the material of the outer race 1, so long as it meets the requirements of a one-way clutch employed in a particular machine at a particular location. The desirable degree of torque must also be taken into consideration.

The magnetic members 4 are fixedly formed on an annular plate 5 as units therewith, and are engaged with the recesses 3 formed on the outer race 1. Rollers 6 are inserted into spaces 7 formed by the cam surfaces 2 of the outer race 1 and the magnetic members 4. Reference numeral 8 designates a shaft.

In the thus-arranged one-way clutch in which the shaft 8 is at the driving side and the outer race 1 is on the driven side, when the shaft 8 rotates in the direction shown by an arrow A, the rollers 4, which are already at their engaging positions shown by the solid line in FIG. 2 by virtue of the attraction of the associated magnetic substances 4, become instantaneously engaged with the outer peripheral surface of the shaft 8 and the cam surfaces 2, and this makes the outer race 1, the shaft 8 and the rollers 6 rotate together.

When the shaft 8 rotates in the direction opposite to that shown by the arrow A, the rollers 6 are moved to the positions shown by the broken line in FIG. 2 by the reverse torque acting counter to the force of the magnetic members 4. This releases the engagement of the rollers, and the shaft 8 races with respect to the outer race 1.

Figure 3:
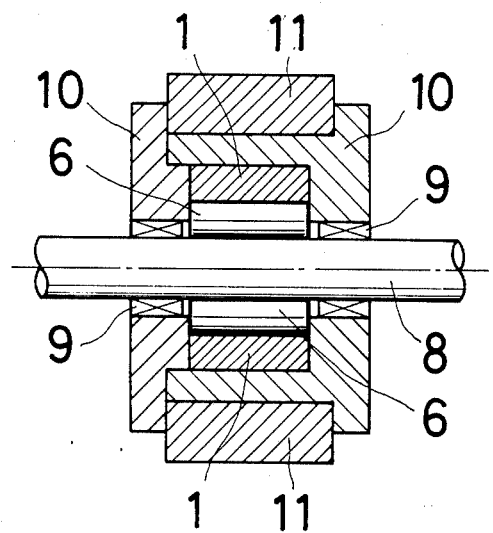
FIG. 3 is a longitudinal cross-sectional view of the one-way clutch applied to a paper feed device of a business machine.

Application of the one-way clutch of the present invention to a driving mechanism of a business machine will be described by referring to FIG. 3.

A casing designated by the reference numeral 10 is supported on the shaft 8 through a bearing 9. The casing 10 has on the outer peripheral surface thereof a rubber roller 11. The inner peripheral surface thereof is connected with the outer peripheral surface of the outer race 1, and this enables the rubber roller 11 to rotate together with the outer race 1.

The embodiment of the one-way clutch according to the present invention employs four rollers 6. It is to be noted, however, that use of an increased number of employed rollers makes it possible for the load to be coped with more easily.

According to the present invention, in a one-way clutch including an outer race 1 with cam surfaces 2 formed on the inner peripheral surface thereof, a shaft 8 forming together with the cam surfaces 2 spaces 7 therebetween, and rollers 6 disposed in the spaces 7 in such a manner as to be urged in one direction, a magnetic member 4 is provided between the cam surfaces 2 formed on the inner peripheral surface of the outer race 1 for urging the associated roller 6 in one direction. As a consequence, when the roller 6 is moved in the space 7, movement thereof is not restricted by the physical resistance, enabling the roller 6 to be suitably moved to its engaging position. In the case of a conventional product which employs metal springs 24, the amount of movement of the rollers 26 may be varied during the transition period from the racing state to the engaging state, the amount of movement depending on the strength with which the rollers 26 are brought into contact with the associated metal springs 24, resulting in the generation of a relatively large degree of backlash. On the other hand, the one-way clutch of the present invention ensures accurate movement of the rollers 6 to their engaging positions. This results in an extremely small degree of backlash. Moreover, the number of parts employed during production can be reduced compared with the conventional product, and the number of assembly processes can be thereby decreased. The one-way clutch of the present invention does not employ metal springs 24, and thereby eliminates physical resistance. This allows for a certain degree of error in the diametrical dimension of the cam surface 2.

Thus, the present invention provides a one-way clutch which has a superior function to that of the conventional product, and which allows for reduced production cost.

We claim:

1. A one-way clutch comprising in combination
   (a) a generally cylindrical outer race (1),
   (b) the inner surface of said outer race (1) including
       (1) a plurality of spaced apart cam surfaces (2), and
       (2) a plurality of spaced apart recesses (3),
           said cam surfaces (2) and said recesses (3) being spaced at alternating intervals around the inner periphery of said outer race (1),
   (c) a plate member (5) having a plurality of magnetic members (4) fixed to one surface thereof at spaced apart intervals that are aligned with said spaced apart recesses (3) so that each magnetic member (4)
       has one portion which is seated within a corresponding recess (3) thereby preventing relative rotational movement between said race (1) and said plate member (5), and
       has another portion that extends inwardly from the interior surface of said race (1) and defines an opening through which a rotary shaft may be accomodated,
   (d) a rotatable shaft (8) extending centrally through both said race (1) and said plate member (5) in said opening defined by the inner extremities of said magnetic members (4),
   (e) a plurality of circumferential spaces located between the interior of said cam surfaces (2) and the exterior of said rotatable shaft (8),
   (f) a roller (6) positioned in each of the circumferential spaces, the axis of each roller (6) being aligned parallel to the axis of said shaft (8),
   whereby upon rotation of said shaft (8) in one direction said the magnetic members (4) will attract said rollers (6) toward them and into a portion of said cam surfaces (2) that will cause said rollers (6) to come into frictional engagement with said shaft (8) so that said rollers (6) and race (1) will remain in a fixed position with respect to said shaft (8) upon rotation of shaft (8), and whereby rotation of said shaft (8) in the opposite direction will move said rollers (6) away from said magnetic members (4) and into a wider portion of said cam surfaces (2) so that the shaft (8) and the rollers (6) will not remain in fixed positions relative to each other upon rotation of said shaft (8).

* * * * *